(12) United States Patent
Morales et al.

(10) Patent No.: US 12,352,686 B2
(45) Date of Patent: Jul. 8, 2025

(54) IN-SITU CONTAMINATION MONITORING

(71) Applicants: Rocky G. Morales, Long Beach, CA (US); Aileen O. Hui, Los Angeles, CA (US); De-Ling Liu, Manhattan Beach, CA (US)

(72) Inventors: Rocky G. Morales, Long Beach, CA (US); Aileen O. Hui, Los Angeles, CA (US); De-Ling Liu, Manhattan Beach, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 823 days.

(21) Appl. No.: 17/570,302

(22) Filed: Jan. 6, 2022

(65) Prior Publication Data

US 2023/0228672 A1 Jul. 20, 2023

(51) Int. Cl.
G01N 21/21 (2006.01)
B64G 1/66 (2006.01)
G02B 21/00 (2006.01)
G02B 21/34 (2006.01)

(52) U.S. Cl.
CPC ............. *G01N 21/211* (2013.01); *B64G 1/66* (2013.01); *G02B 21/0004* (2013.01); *G02B 21/34* (2013.01)

(58) Field of Classification Search
CPC .... G01N 21/211; B64G 1/66; G02B 21/0004; G02B 21/34
USPC ............ 356/36, 38, 244, 432–440, 335–343; 73/864.71, 864.72, 864.33, 864.34
See application file for complete search history.

(56) References Cited

U.S. PATENT DOCUMENTS

| 4,675,034 A * | 6/1987 | Lynch | G01N 1/2205 55/504 |
| 5,412,221 A * | 5/1995 | Curtis | G01N 15/06 250/573 |
| 7,041,153 B2 * | 5/2006 | Totoki | B03C 3/47 95/59 |
| 2008/0314966 A1 * | 12/2008 | Elston | B65D 81/263 229/120 |
| 2010/0132341 A1 * | 6/2010 | Stefanick | F01N 3/206 60/297 |

* cited by examiner

Primary Examiner — Jamil Ahmed
(74) Attorney, Agent, or Firm — LeonardPatel PC

(57) ABSTRACT

A multi-purpose in-situ contamination sampler includes an inner frame surrounded by a plurality of removable or attachable pieces, each of which include of a single witness surface configured to collect both particulate and molecular contamination within an environment on a payload or a spacecraft.

17 Claims, 9 Drawing Sheets

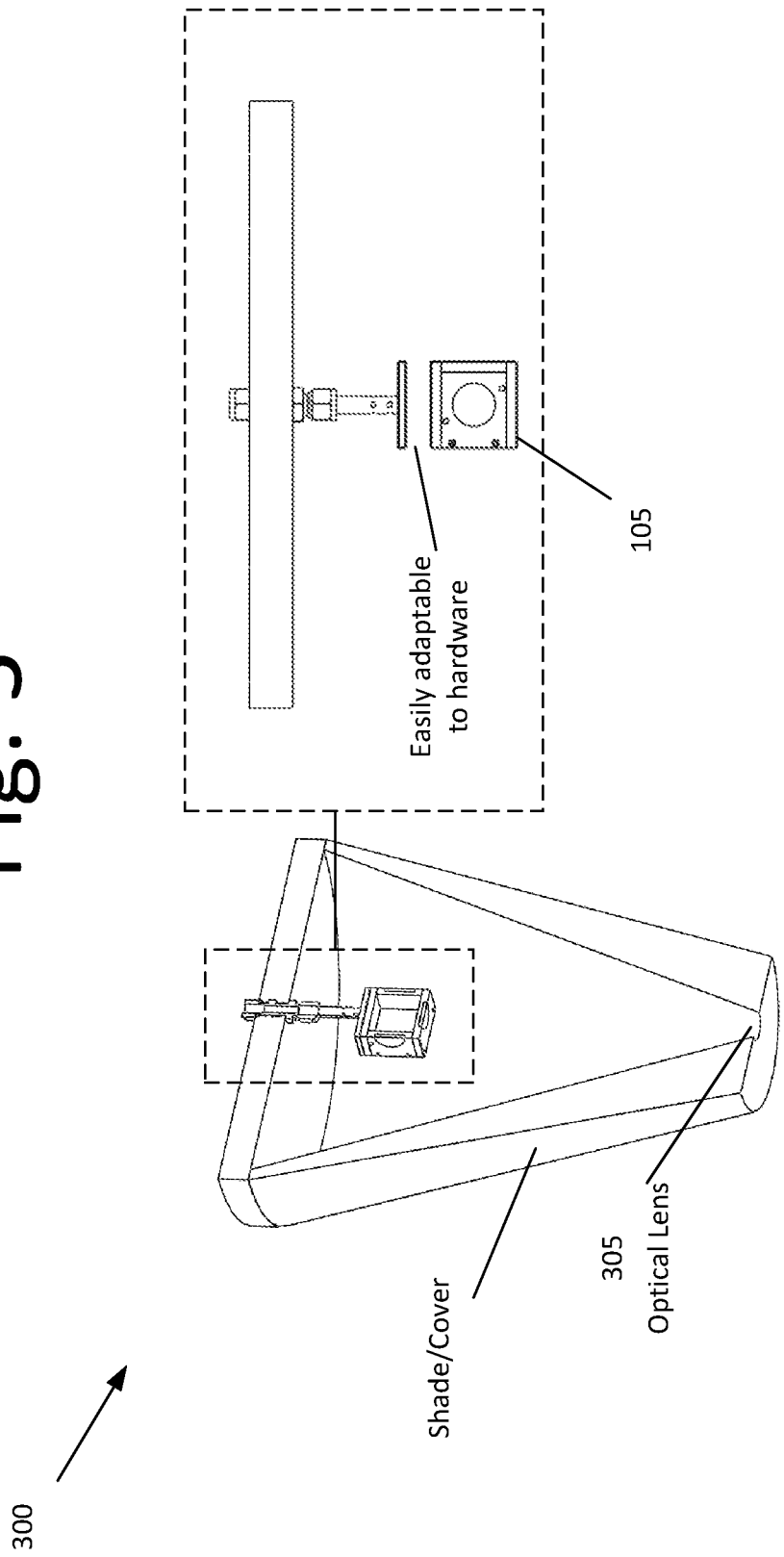

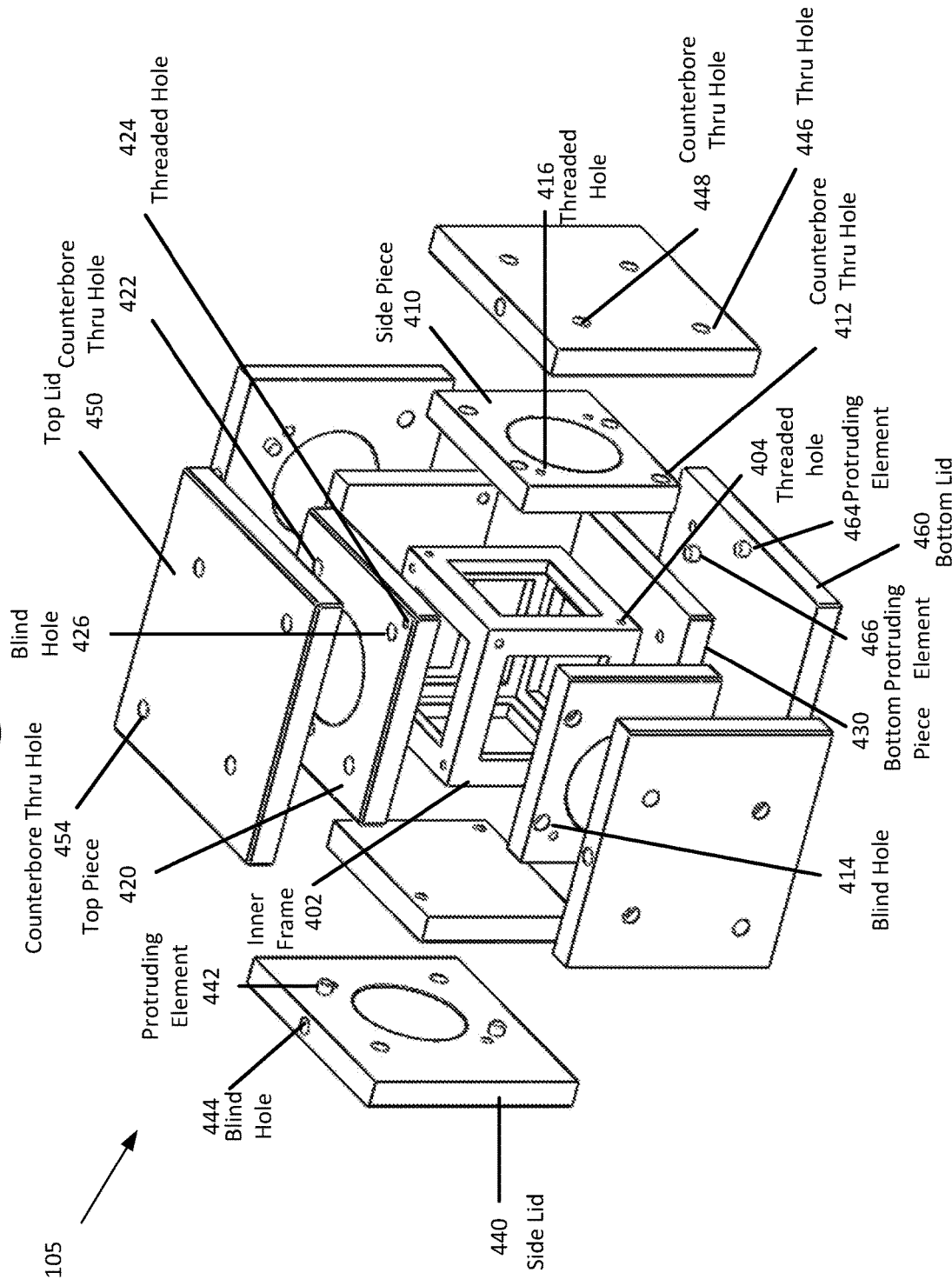

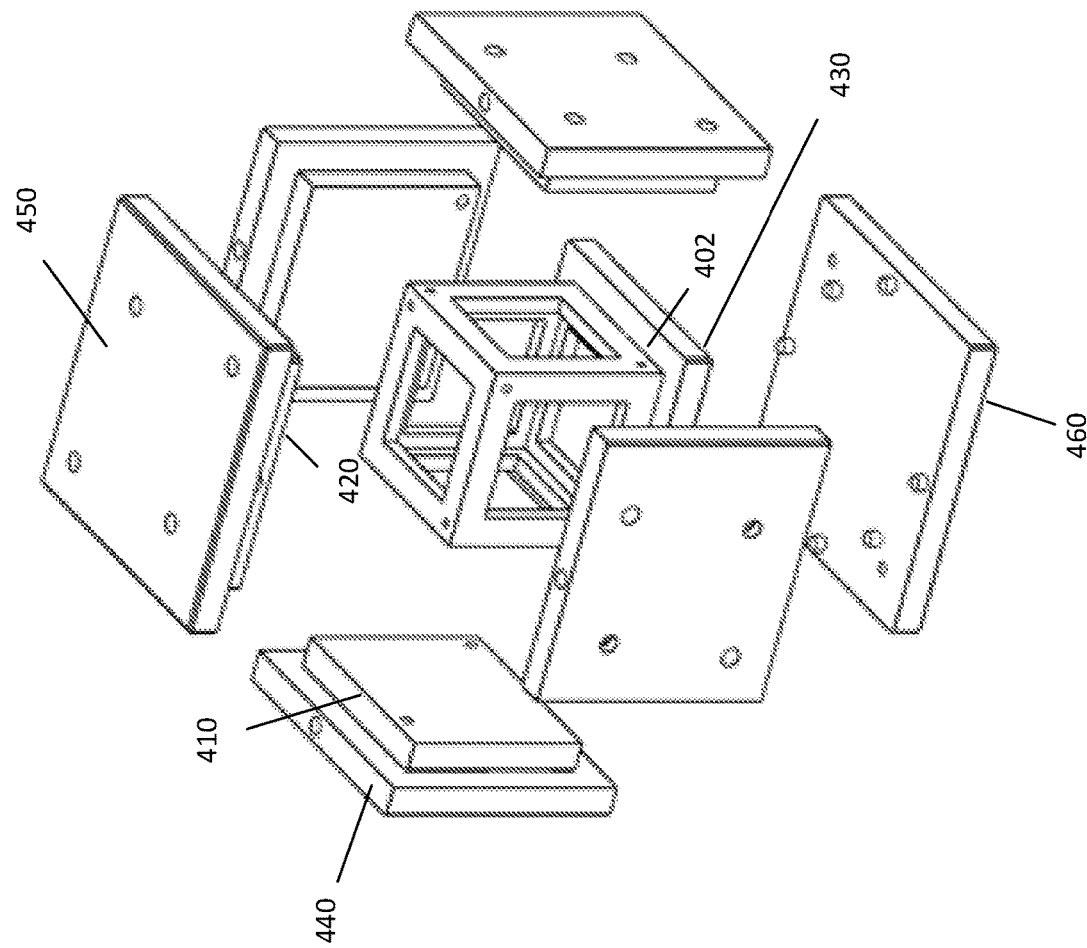

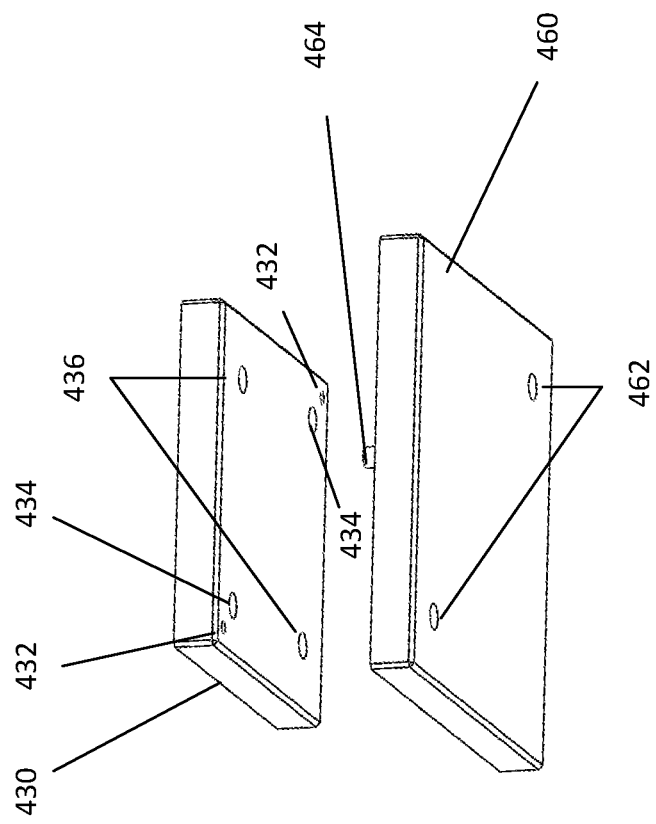

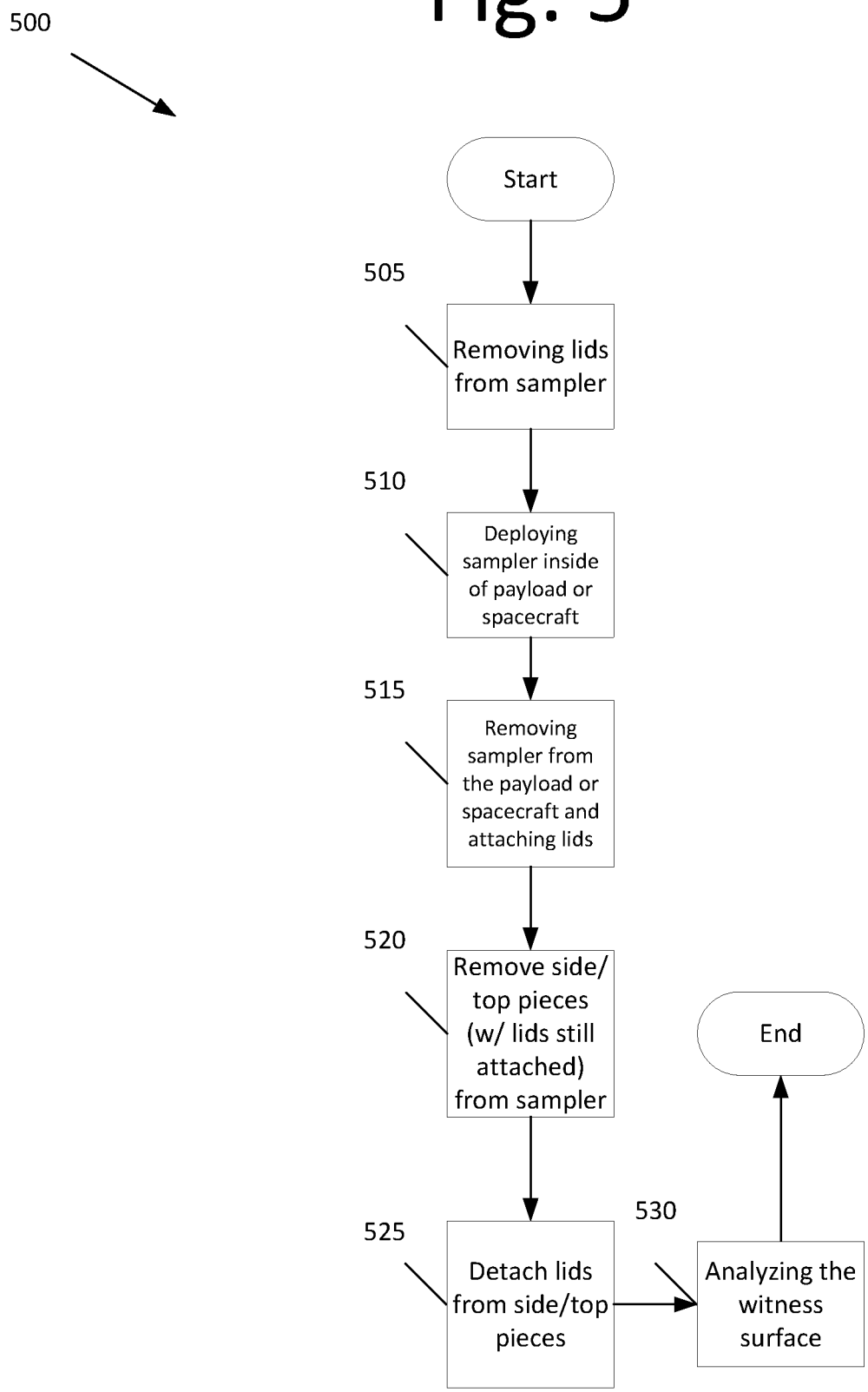

IN-SITU CONTAMINATION MONITORING

STATEMENT OF GOVERNMENT INTEREST

This invention was made with government support under Contract No. FA8802-19-C-0001 awarded by the Department of the Air Force. The government has certain rights in the invention.

FIELD

The present invention relates to contamination monitoring system, and more particularly, to an in-situ contamination monitoring system.

BACKGROUND

In the aerospace industry, there is an interest in assessing the level of contamination on space systems during assembly, integration and testing (AI&T). Particulate and molecular contamination on sensitive surfaces, such as optical coatings, can negatively impact space system performance. Monitoring, controlling and mitigating contamination is essential in meeting system performance requirements and ensuring mission success. The current industry method for contamination environmental monitoring is to deploy witness plate surfaces in facilities where sensitive hardware is housed.

However, current industry standards have many limitations. For example, depending on the ground operation, sensitive surfaces may be inaccessible due to hardware geometry constraints such that their contaminant levels may not be well represented by facility air cleanliness monitoring and/or contamination deposition measurements. An inaccessible surface, for purposes of explanation, may be a sensor placed behind a cover.

Accordingly, an improved in-situ contamination monitoring sampler may be beneficial.

SUMMARY

Certain embodiments of the present invention may provide solutions to the problems and needs in the art that have not yet been fully identified, appreciated, or solved by current molecular and particulate contamination monitoring technologies. For example, some embodiments of the present invention pertain to an in-situ monitoring system configured to monitor molecular and particulate contamination.

In one embodiment, a multi-purpose in-situ contamination sampler includes an inner frame surrounded by a plurality of removable or attachable pieces, each of which include a single witness surface configured to simultaneously collect both particulate and molecular contamination within an environment on a payload or a spacecraft.

In another embodiment, a multi-purpose in-situ contamination sampler includes an inner frame surrounded by a plurality of removable or attachable pieces, each of which comprise a single witness surface configured to collect both particulate and molecular contamination within an environment on a payload or a spacecraft. The single witness surface on each of the plurality of removable or attachable pieces includes a silicon wafer or window (silicon window is used herein) configured to collect both the particulate and the molecular contamination within the environment on the payload or the spacecraft.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a diagram illustrating a cross-section of a sampler deployed within a payload or satellite, according to an embodiment of the present invention.

FIGS. 4A-E are diagrams illustrating the structure of sampler 105, according to an embodiment of the present invention.

FIG. 5 is a flow diagram illustrating a method for deploying and analyzing the sampler, according to an embodiment of the present invention.

DETAILED DESCRIPTION OF THE EMBODIMENTS

Some embodiments generally pertain to a multi-purpose in-situ contamination sampler (hereinafter the "sampler") that identifies molecular and particulate contamination on a single witness surface. A single witness surface is defined as a surface that collects both particulate and molecular contamination simultaneously. The sampler may be deployed inside a telescope or payload. The sampler may minimize cross-contamination that may occur during handling of the sampler. There is no direct handling of the witness surface that will undergo laboratory analysis.

Figure 1:
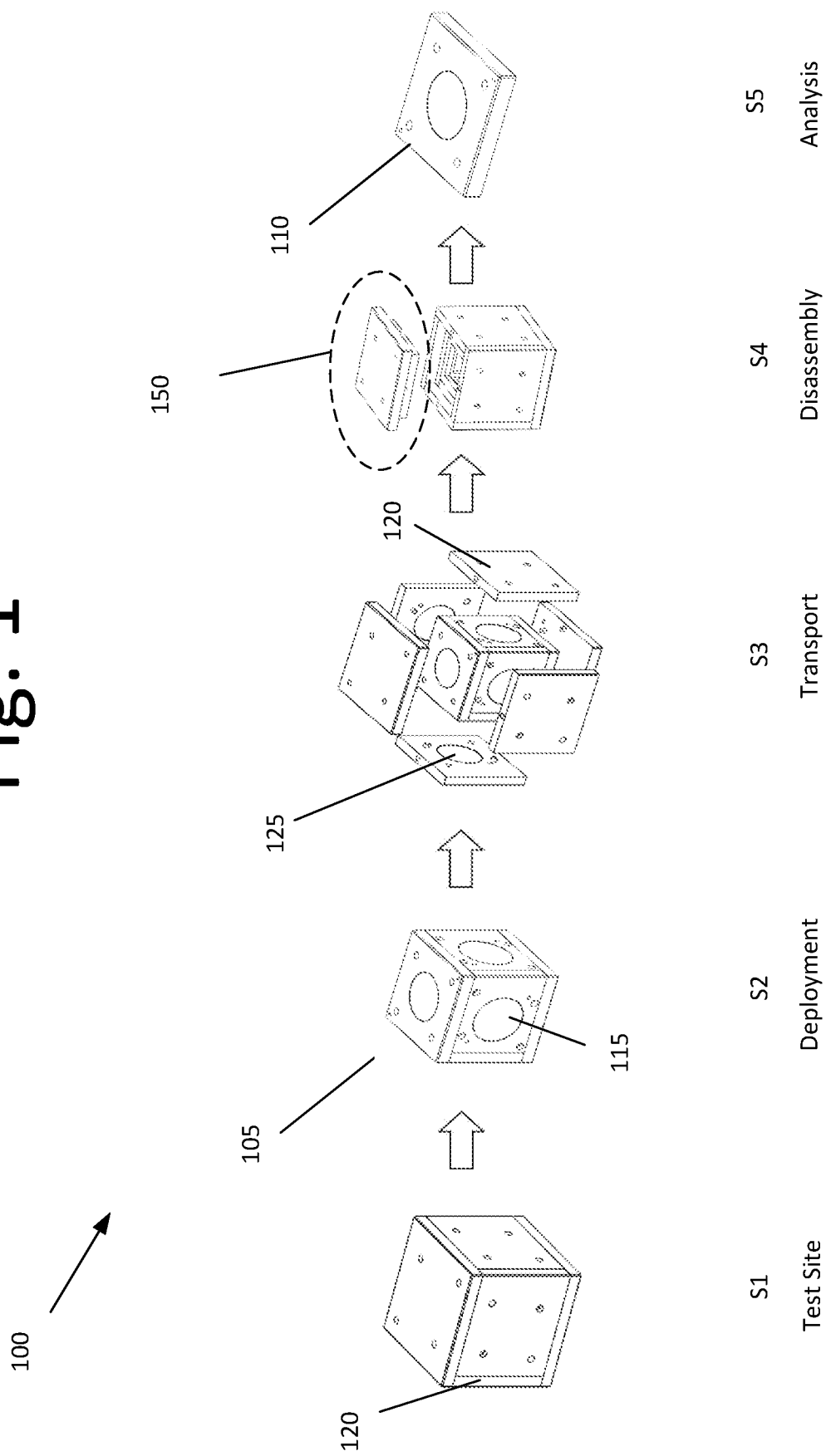
FIG. 1 is a flow chart illustrating a timeline from deployment to analysis of sampler, according to an embodiment of the present invention.

The sampler simplifies end-to-end handling from transportation, deployment, and to analysis. FIG. 1, for example, is a flow chart illustrating a timeline 100 from deployment to analysis of sampler 105, according to an embodiment of the present invention. Sampler 105 has a plurality of sides 110, each of which have a silicon window 115 that collects molecular and particulate contamination. For purposes of explanation and simplicity, we will refer to contamination rather than "molecular and particulate contamination". Having windows 115 on multiple sides captures contamination from various orientations. Contamination may vary based on orientation of surface. This provides more in-depth characterization than the traditional single oriented witness surface.

In some embodiments, a silicon window is used as the sampling surface. A silicon wafer is thinner (~0.3 mm) and susceptible to shattering. On the other hand, a silicon window is thicker (~3 mm) and not as susceptible to shattering. It should be appreciated that the silicon window is made of the same composition as a silicon wafer; the only difference however is that it is thicker. The force required to break a material is positively correlated with the thickness of the material (so the thicker it is, the more force required to break it).

As shown in timeline 100, at S1, sides 110 of sampler 105 is enclosed on all six sides by lids 120 prior to removal. In some embodiments, not all six (6) sides are identical, and neither are the lids. For example, 4 side pieces are identical to each other, but the top or bottom pieces may be unique. Similarly, the 4 side lids are identical to each other, but the top lid is unique, and the bottom lid is unique. The top piece is similar to the 4 side pieces in that top piece also has a silicon window 115, but the overall dimension as well as the hole placements are different. Similarly, the 4 side lids and the top lid all have silicon windows 125, but the overall dimension and hole placements for the side and top lids are different. The bottom piece has the same dimensions as the top piece but has different hole placements and has no silicon window 115. Similarly, the bottom lid and the top lid have the same dimensions, but their hole placements are different and the bottom lid has no silicon window 125.

Figure 2:
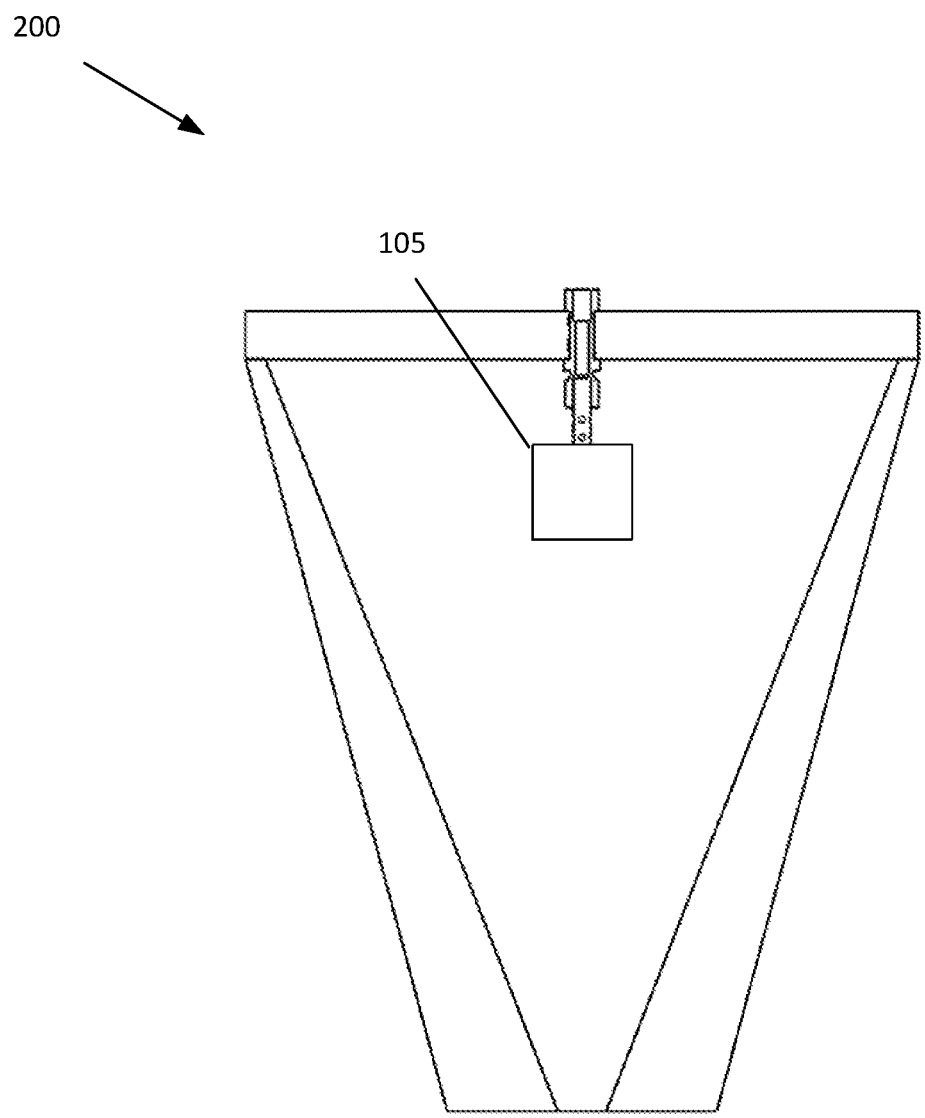
FIG. 2 is a diagram illustrating a payload containing sampler, according to an embodiment of the present invention.

At S2, when lids 120 are removed, sampler 105 is deployed on a satellite or a payload, thereby exposing sampler 105 to an environment within the payload or satellite. See FIG. 2, which is a diagram illustrating a payload 200 containing sampler 105, according to an embodiment of the present invention.

Continuing with FIG. 1, at S3, after sampler 105 has been in use for a predetermined period of time (e.g., 30 days, 60 days, etc.), sampler 105 is removed from the payload or satellite, and each lid 120 is placed back on a corresponding side 110 of sampler 105 for transport to the laboratory. It should be noted that, at this point, the side, top, and bottom pieces should still be attached to the frame. Because particulates can move during transport of sampler 105, each lid 120 has its own silicon window 125 to match with that of a corresponding silicon window 115. This way, if there were any particulate redistribution during transport, the redistribution is captured by lid 120, and in particular, corresponding silicon window 125. It should also be noted that lids 120 provide a protective surface to prevent damage to sampler 105, including silicon windows 115, and also minimizes cross-contamination during transport.

At S4, each lid 120, including a corresponding side 110 of sampler 105 is removed. In some embodiments (e.g., at S4), side 110 of sampler 105 is removed with the corresponding lid 120 still attached to side 110. See item 150.

At S5, lid 120 is removed from side 110 at the laboratory. Subsequently, 115 and 125 are sequentially analyzed. This handling process minimizes cross-contamination from occurring on the witness surface 115. If lids 120 were removed from sides 110 while sides 110 are still attached to sampler 105, there would be a greater risk for cross-contamination. Further, subsequent removal of sides 110 from sampler 105 without the lids 120 attached would increase the risk of damaging silicon windows 115 in some embodiments. For example, tools required to detach sides 110 from sampler 105 may accidentally make contact with silicon windows 115, causing damage.

FIG. 3 is a diagram illustrating a cross-section of a sampler 105 deployed within a payload or satellite 300, according to an embodiment of the present invention. Let's say for example there is an optical sensor 305 inside payload 300 and is hidden within the payload. In this example, this sensor 305 is hidden in the flight hardware and there is an interest in characterizing the environment surrounding this sensor. In this case, sampler 105 may be placed inside of payload 300, i.e., within the environment within payload 300. In some embodiments, sampler 105 due to its small size may be placed next to or near optical sensor (e.g., lens) 305 to capture particulate and/or molecular contamination within the environment.

Figure 4C:
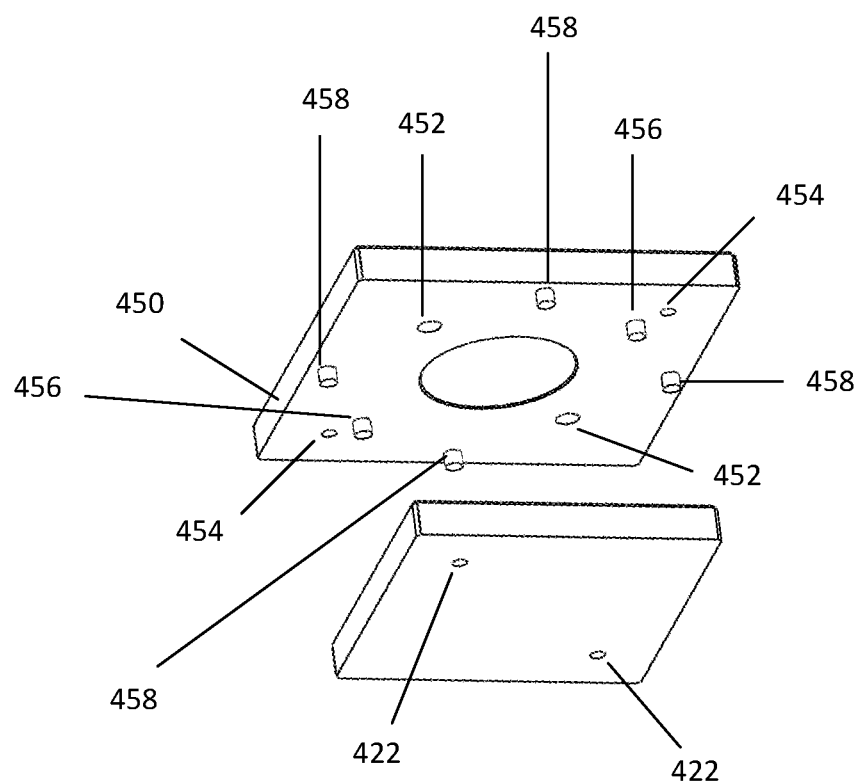
Figure 4E:
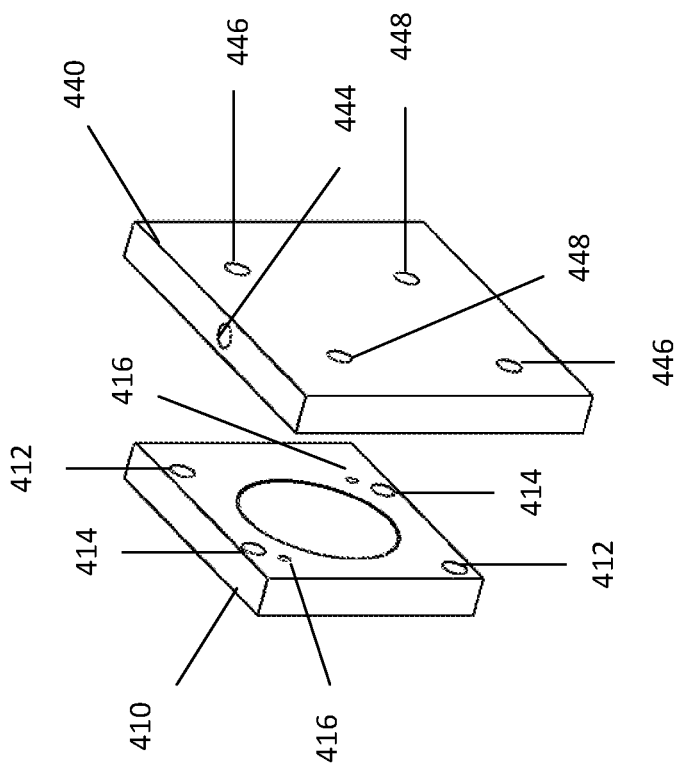

The sampler may allow for monitoring and characterization of contamination inside the payload which would otherwise be unaccounted for without an in-situ sampler. The sampler's design is also flexible for the end-user to customize a mating mechanism onto the hardware. For instance, the sampler's design is versatile, such that it can easily be mounted on various types of hardware configurations. This is enabled by the blank side of the sampler that has no witness surface. See, for example, numeral 430 of FIG. 4A. This side of the sampler is used for mounting on the end-user's hardware. The end-user can then customize a fixture to mount the sampler to the hardware. See, for example, FIG. 3, which shows an example of how sampler 105 can be mounted on a piece of hardware. For example, in some embodiments, sampler 105 may be mounted to the adjacent surface using screws.

It should be appreciated that sampler 105 has a small footprint. In some embodiments, the footprint of sampler 105 may be 2"×2"×2" with a silicon window being 1"Øx~3 mm (i.e., 1 inch in diameter and approximately 3 millimeters in thickness). This is important because sampler 105 may be incorporated into or accommodated within the flight hardware. Unlike other samplers, such as nonvolatile residue (NVR) plates, the silicon windows on sampler 105 may collect both particulate and molecular contamination.

Put simply, other samplers, such as the NVR plate, are larger and require different types of witness surfaces to address molecular/particulate contamination. The NVR plate is an aluminum plate and requires a time-consuming gravimetric technique. Per ASTM E1234-12, a 1'×1' NVR plate is typically analyzed in the following way: a solvent is first used to rinse the NVR plate (the purpose of the solvent is to dissolve any molecular contaminants on the NVR plate). The solvent rinsate is then collected, and the solvent is subsequently evaporated, leaving behind the contaminant residue. The residue is then weighed to determine the total mass of molecular contaminants collected on the NVR plate.

With the sampler described herein, however, the silicon window, which collects both types of contaminants, is analyzed by way of optical microscopy and ellipsometry for particulate and molecular contaminants, respectively.

FIGS. 4A-E are diagrams illustrating the structure of sampler 105, according to an embodiment of the present invention. In some embodiments, sampler 105 has an inner frame 402. Frame 402 may include a plurality of threaded holes 404. Connected with, or attached to, inner frame 402 are side pieces 410, a top piece 420, and a bottom piece 430. Side pieces include a plurality of counterbore thru holes 412 that facilitates the insertion of screws within receiving threaded holes 404.

On the outer face of side pieces 410, a plurality of blind holes 414 are configured to receive protruding elements 442 on lids 440. As protruding elements 442 are being inserted inside of blind holes 414, lids 440 are aligned onto side pieces 410. Similarly, on the outer face of top piece 420, a plurality of receiving blind holes 426 are configured to receive protruding elements 456 on lid 450. Similarly, on the outer face of bottom piece 430, a plurality of blind holes 434 are configured to receive protruding elements 466 on bottom lid 460.

Frame 402 has threaded holes in some embodiments. Side-pieces 410 have both blind holes 414 and counterbore thru holes 412. Side-pieces 410 are held onto inner frame 402 by inserting screws into counterbore thru holes 414 of side-piece 410 and fastened onto the threaded holes (receiving holes) 404 on frame 402. Similarly, top piece 420 is fastened onto inner frame 402 by inserting screws into counterbore thru holes 422 onto the threaded holes (receiving holes) 404 on frame 402. Bottom piece 430 is also fastened onto inner frame 402 by inserting screws into counterbore thru holes 436 onto threaded holes (receiving holes) 404 on frame 402.

Side lids 440, top lid 450, and bottom lid 460 are fastened to sampler 105 in following sequence: side lids 440 are first attached to side pieces 410, then top lid 450 is fastened to top piece 420, and finally, bottom lid 460 is attached to bottom piece 430. A plurality of receiving blind holes 444 on side lids 440 are configured to receive protruding elements 458 on top lid 450 and protruding elements 464 on bottom lid 460. Side lids 440 are fastened onto side pieces 410 by inserting screws in counterbore thru holes 448 of lids 440 and fastened onto to side-piece threaded holes 416. Top lid 450 is fastened onto top piece 420 by inserting screws in counterbore thru holes 454 of lid 450 and fastened onto top piece threaded holes 424. Bottom lid 460 is fastened onto bottom piece 430 by inserting screws in counterbore thru holes 462 of bottom lid 460 and fastened onto bottom piece threaded holes 432.

The following procedure describes how the sampler 105, with all six lids attached, is disassembled for analysis. The side and top pieces are removed from the inner frame 420, with corresponding lids still attached (see FIG. 4B), in the following sequence: the top piece 420 (with top lid 450 still attached) is first unfastened, then the bottom lid 460, and finally, the four side pieces 410 (with the side lids 440 still attached). Thru holes 452 on top lid 450 are used access the screws attaching top piece 420 to inner frame 402. Similarly, thru holes 446 on side lids 440 are used to access the screws attaching side pieces 410 to inner frame 402. These thru holes enable detachment of each piece from the inner frame with the corresponding lids still attached. Subsequently, each lid can be removed from the corresponding piece individually. For example, side lid 440 is detached from side piece 410 by accessing the screw through counterbore thru holes 448 on side lid 440 and unfastening the screw attached to threaded holes 416 on side piece 410. Similarly, top lid 450 is detached from top piece 420 by accessing the screw through counterbore thru holes 454 on top lid 450 and unfastening the screw attached to threaded holes 424 on top piece 420.

FIG. 5 is a flow diagram illustrating a method 100 for deploying and analyzing the sampler, according to an embodiment of the present invention. The method includes removing at 505 a plurality of lids from the sampler. At 510, the method includes deploying the sampler within an environment of a payload or a spacecraft, allowing the sampler to collect particulate and molecular contamination. The method at 515 includes removing the sampler from the environment and attaching the plurality of lids to the sampler. The method at 520 includes removing each of the plurality of side pieces with lids attached in sequence. The lids are then detached from the side and top pieces prior to method 525. The method at 530 includes analyzing the witness surface for contamination using microscopy and ellipsometry.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A multi-purpose in-situ contamination sampler, comprising:
   an inner frame surrounded by a plurality of removable or attachable pieces, each of which comprise of a single witness surface configured to collect both particulate and molecular contamination within an environment where sensitive hardware or material is housed; and
   a plurality of outer lids, each of which are attached to a corresponding one of the plurality of removable or attachable pieces preventing the collected particulate and the collected molecular contamination from escaping.

2. The sampler of claim 1, wherein the single witness surface on each of the plurality of removable or attachable pieces comprise a silicon window configured to collect both the particulate and the molecular contamination where the sensitive hardware or material is housed.

3. The sampler of claim 1,
   wherein each of the plurality of outer lids provides a protective surface to prevent cross-contamination and damage to a corresponding piece of the plurality of removable or attachable pieces.

4. The sampler of claim 3, wherein each of the plurality of outer lids comprises a silicon window that accounts for particle redistribution between the silicon window on the corresponding piece and the silicon window on each of the plurality of outer lids.

5. The sampler of claim 1, wherein one piece of the plurality of removable or attachable pieces lacks the single witness surface and is attached to an adjacent surface inside of the environment.

6. The sampler of claim 5, wherein the one piece is mounted to the adjacent surface by way of screws and/or magnets.

7. The sampler of claim 5, wherein the one piece comprises a magnetic surface configured to attach to the adjacent surface by way of magnetic force.

8. The sampler of claim 1, further comprising a dimension of 2 inch×2 inch×2 inch with the single witness window being 1 inch in diameter×approximately 3 millimeters in thickness.

9. A multi-purpose in-situ contamination sampler, comprising:
an inner frame surrounded by a plurality of removable or attachable pieces, each of which comprise of a single witness surface configured to collect both particulate and molecular contamination within an environment where sensitive hardware or material is housed, wherein
the single witness surface on each of the plurality of removable or attachable pieces comprise a silicon window configured to collect both the particulate and the molecular contamination within the environment on the payload or the spacecraft; and
a plurality of outer lids, each of which are attached to a corresponding one of the plurality of removable or attachable pieces preventing the collected particulate and the collected molecular contamination from escaping.

10. The sampler of claim 9,
wherein each of the plurality of outer lids provides a protective surface to prevent damage and cross-contamination to a corresponding piece of the plurality of removable or attachable pieces.

11. The sampler of claim 10, wherein each of the plurality of outer lids comprises a silicon window that accounts for particle distribution between the silicon window on the corresponding piece and the silicon window on each of the plurality of outer lids.

12. The sampler of claim 9, wherein one piece of the plurality of removable or attachable pieces lacks the single witness surface and is attached to an adjacent surface inside of the environment.

13. The sampler of claim 12, wherein the one piece is mounted to the adjacent surface by way of screws and/or magnets.

14. The sampler of claim 12, wherein the one piece comprises a magnetic surface configured to attach to the adjacent surface by way of magnetic force.

15. The sampler of claim 9, further comprising a dimension of 2×inches×2 inches×2 inches with the single witness window being 1 inch in diameter×approximately 3 millimeters in thickness.

16. A multi-purpose in-situ contamination sampler, comprising:
an inner frame surrounded by a plurality of removable or attachable pieces, each of which comprise of a single witness surface configured to collect both particulate and molecular contamination within an environment where sensitive hardware or material is housed, wherein
the single witness surface on each of the plurality of removable or attachable pieces comprise a silicon window configured to collect both the particulate and the molecular contamination within an environment; and
a plurality of attachable outer lids, each of which are attached to a corresponding one of the plurality of removable or attachable pieces preventing the collected particulate and the collected molecular contamination from escaping the silicon window.

17. The sampler of claim 16,
wherein the corresponding attachable lid provides a protective surface to prevent cross-contamination and damage to a corresponding piece of the removable or attachable piece.

* * * * *